(12) United States Patent
Scheffer et al.

(10) Patent No.: US 11,140,137 B2
(45) Date of Patent: Oct. 5, 2021

(54) METHOD AND INDUSTRIAL COMPUTING APPARATUS FOR PERFORMING A SECURE COMMUNICATION

(71) Applicant: OMRON Corporation, Kyoto (JP)

(72) Inventors: Fred Scheffer, Den Bosch (NL); Praveen Pujari, Den Bosch (NL)

(73) Assignee: OMRON Corporation, Kyoto (JP)

( * ) Notice: Subject to any disclaimer, the term of this patent is extended or adjusted under 35 U.S.C. 154(b) by 395 days.

(21) Appl. No.: 16/220,068

(22) Filed: Dec. 14, 2018

(65) Prior Publication Data

US 2019/0124050 A1     Apr. 25, 2019

Related U.S. Application Data

(63) Continuation of application No. PCT/JP2017/007633, filed on Feb. 28, 2017.

(30) Foreign Application Priority Data

Jul. 8, 2016   (EP) ..................................... 16178608

(51) Int. Cl.
*H04L 29/06*    (2006.01)
*G06F 21/60*    (2013.01)
(Continued)

(52) U.S. Cl.
CPC ...... *H04L 63/0428* (2013.01); *G06F 9/45558* (2013.01); *G06F 9/5077* (2013.01);
(Continued)

(58) Field of Classification Search
None
See application file for complete search history.

(56) References Cited

U.S. PATENT DOCUMENTS 8,069,290 B2 * 11/2011 Conti ...................... G06F 13/24
                                                          710/261
8,996,864 B2 *  3/2015 Maigne ............... G06F 9/45558
                                                          713/164
(Continued)

FOREIGN PATENT DOCUMENTS

CN         1849587 A      10/2006
CN       103136052 A       6/2013
(Continued)

OTHER PUBLICATIONS

"S. Pinto, Free TEE: When real-time and security meet, Sep. 2015, IEEE, pp. 1-4" (Year: 2015).*

(Continued)

*Primary Examiner* — Joseph P Hirl
*Assistant Examiner* — Hassan Saadoun
(74) *Attorney, Agent, or Firm* — Metrolex IP Law Group, PLLC

(57) ABSTRACT

A method is provided for performing a secure communication between a real-time operating system and a general purpose operating system. The systems are provided in a single computing apparatus and separated by a virtual machine monitor. The systems include a first and second open platform communications interfaces, respectively. The method includes: receiving a request with the virtual machine monitor from a user via the first or second open platform communications interface to access data of the real-time operating system from the general purpose operating system or to access data of the general purpose operating system from the real-time operating system; establishing a secure communication path via a software bus between the first and the second open platform communications interfaces according to the request; and performing a secure communication between the real-time operating system and the general purpose operating system via. the (Continued)

established secure communication path for accessing the data.

15 Claims, 3 Drawing Sheets

(51) Int. Cl.
 *G06F 9/455* (2018.01)
 *G06F 21/53* (2013.01)
 *G06F 9/50* (2006.01)
 *G06F 13/42* (2006.01)
(52) U.S. Cl.
 CPC .......... *G06F 13/4204* (2013.01); *G06F 21/53* (2013.01); *G06F 21/606* (2013.01); *H04L 63/04* (2013.01); *H04L 67/42* (2013.01); *G06F 2009/45587* (2013.01)

(56) References Cited

U.S. PATENT DOCUMENTS

| | | | |
|---|---|---|---|
| 9,100,361 B1* | 8/2015 | Lucchesi | ................ H04L 63/00 |
| 2006/0282836 A1* | 12/2006 | Barker | .................. G06F 9/526 |
| | | | 718/103 |
| 2007/0033260 A1 | 2/2007 | Grouzdev et al. | |
| 2007/0226795 A1* | 9/2007 | Conti | .................. G06F 21/554 |
| | | | 726/22 |
| 2009/0233705 A1 | 9/2009 | LeMay et al. | |
| 2015/0264047 A1* | 9/2015 | Roy | ........................ G06F 21/53 |
| | | | 726/4 |
| 2015/0355946 A1* | 12/2015 | Kang | .................... G06F 9/5072 |
| | | | 718/104 |
| 2017/0163444 A1* | 6/2017 | McLaughlin | ......... H04W 88/16 |
| 2017/0300043 A1 | 10/2017 | Deiretsbacher et al. | |

FOREIGN PATENT DOCUMENTS

| | | |
|---|---|---|
| CN | 103477322 A | 12/2013 |
| JP | 2005-310035 A | 11/2005 |
| JP | 2012-205292 A | 10/2012 |
| WO | 2012/094222 A2 | 7/2012 |
| WO | 2016/045736 A1 | 3/2016 |

OTHER PUBLICATIONS

"Se Won Kim, Secure Device Access for Automotive Software, Dec. 2013, IEEE, pp. 1-5" (Year: 2013).*
The International Search Report of PCT/JP2017/007633 dated Jun. 21, 2017.
The Written Opinion of PCT/JP2017/007633 dated Jun. 21, 2017.
The European Search Report of EP16178608.2 which claims priority in this application. Date of completion of the search is Sep. 6, 2016.
The Chinese Office Action dated Nov. 3, 2020 in a counterpart Chinese application.
The Japanese Office Action dated Jan. 7, 2020 in a counterpart Japanese application.

* cited by examiner

METHOD AND INDUSTRIAL COMPUTING APPARATUS FOR PERFORMING A SECURE COMMUNICATION

CROSS REFERENCE TO RELATED APPLICATIONS

This application is a continuation application of International Application No. PCT/JP2017/007633, filed on Feb. 28, 2017, which claims priority based on the Article 8 of Patent Cooperation Treaty from prior Japanese Patent Application No. 16178608.2, filed on Jul. 8, 2016, the entire contents of which are incorporated herein by reference.

TECHNICAL FIELD

The disclosure relates to a method for performing a secure communication between a real-time operating system and a general purpose operating system. The disclosure further relates to a computer program product comprising a program code for executing such a method. Moreover, the disclosure relates to an industrial computing apparatus for performing a secure communication between a real-time operating system and a general purpose operating system and to an industrial communication system comprising such an industrial computing apparatus.

BACKGROUND ART

Industrial automation and/or communications systems include various enterprise software applications (which are also known as information technology (IT) or manufacturing software applications) for monitoring and/or managing different aspects of production, as well as various manufacturing (or automation) controllers which control the actual manufacturing processes. The enterprise software applications and manufacturing controllers can be considered to operate in two different domains of an industrial automation system, namely, an enterprise domain and a control domain, respectively. For this purpose, an industrial communication system often comprises multiple devices that have to different operating systems which are assigned to the different domains. These operating systems may have different security levels and thus, communication between these operating systems may be subject to different security requirements or performance requirements. The different security requirements may depend on different security categorizations of the assigned devices. For example, critical or sensitive data may have higher security requirements, i.e. may need to be protected against attacks, than other data. Different performance requirements may depend on the kind of devices. For example, some devices may have a real-time constraint and may thus be assigned to a real-time operating system, wherein other devices do not have this kind of constraint and can be assigned to a general purpose operating system.

CITATION LIST

Patent Literature

[PTL 1]
U.S. Patent Application Publication No. US 2009/0233705 A1
[PTL 2]
U.S. Patent Application Publication No. US 2015/0264047 A1

SUMMARY OF INVENTION

Technical Problem

A real-time operating system (RTOS) may for example be used to control machinery and industrial systems. An RTOS may manage the resources of a computer so that a particular operation executes in precisely the same amount of time, every time it occurs. In a complex machine, having a part move more quickly just because system resources are available may be just as catastrophic as having it not move at all because the system is busy.

On the other hand, a general purpose operating system (GPOS) may be used to handle operator interfaces, databases, and general-purpose computing tasks. Examples for a GPOS are inter alia Apple OS X, Linux and its variants, and Microsoft Windows.

In industrial communication systems, a RTOS and a GPOS may be combined in one single computing apparatus, for example a computer. However, as the operating systems have different security and performance requirements, the operating systems may be virtually separated within the computing apparatus. In order to perform a communication between the operating systems, for example for exchanging data between the operating systems or devices being assigned to the operating systems, a communication path between the different operating systems need to be provided.

One or more aspects may provide an improved and secure communication between different operating systems.

Solution to Problem

Accordingly, a method for performing a secure communication between a real-time operating system (RTOS) and a general purpose operating system (GPOS) is suggested, wherein the real-time operating system and the general purpose operating system are provided in a single computing apparatus and are separated by a virtual machine monitor. The real-time operating system comprises a first open platform communications interface and the general purpose operating system comprises a second open platform communications interface. The method comprises the following steps: receiving a request with the virtual machine monitor from a user via the first or the second open platform communications interfaces to access data of the real-time operating system from the general purpose operating system or to access data of the general purpose operating system from the real-time operating system, establishing a secure communication path via a software bus between the first and the second open platform communications interfaces according to the request, and performing a secure communication between the real-time operating system and the general purpose operating system via the established secure communication path for accessing the data.

Using the suggested method, it is possible to provide a secure communication between different operating systems being included in one single computing apparatus. The single computing apparatus may be a computer or the like which is capable of hosting a plurality of operating systems on one computing system. The single computing apparatus may communicate with other devices over a network. The single computing apparatus may be an industrial computing apparatus.

The operating systems are separated via a virtual machine monitor, which may also be called hypervisor. The virtual machine monitor serves to separate the two operating systems and to control and manage the communication between the operating systems. The virtual machine monitor is a piece of computer software, firmware or hardware that creates and runs virtual machines, in this context virtual machines which have the two operating systems RTOS and GPOS. "Separated" in this context may denote that the two operating systems cannot directly read and write data to each other but only via the virtual machine monitor and the software bus.

In order to maintain the security of each operating system, i.e. to avoid a negative effect on the security between the operating systems by opening the barrier between the GPOS and the RTOS, the virtual machine monitor may establish a secure communication path between the GPOS and the RTOS. "Secure" in this context may denote that the communication path may use security features in order to prevent any attack on the communication path itself or to protect the data being transmitted between the operating systems via the communication path.

The communication path may be provided via a software bus, which may be also called "communication channel". A software bus may denote a shared communication channel that facilitates or enables connections and communication between the operating systems GPOS and RTOS.

When a request from a user is received to access data of the RTOS from the GPOS or vice versa, the virtual machine monitor establishes the communication path and communication between the operating systems can be carried out. The communication path may be established between communications interfaces of the operating systems. The communications interfaces may be open platform communications (OPC) interfaces. OPC may refer to a series of standards and specifications for industrial telecommunication. OPC specifies the communication of real-time plant data between control devices from different manufacturers. Each of the operating systems implements one OPC interface.

The user request may originate from a normal user or from a user application, i.e. an application that uses the OPC and is done automatically.

According to an embodiment, the secure communication path uses a first and a second communication protocol. The first communication protocol may be a communication protocol for a parallel data bus and the second communication protocol may be a protocol for a dual request/response bus.

The virtual machine monitor may use the dual request/response bus for transmitting requests and responses to these requests between the operating systems. When transmitting the requested data, the parallel data bus may be used which provides a communication channel in each direction for transmitting data.

According to a further embodiment, the secure communication is a communication using certificates and/or signatures.

Certificates or signatures may be used to verify the identity of each of the operating systems, to verify the origin of transmitted data or to encode the transmitted data. For example, the RTOS may transmit the data via the software bus. The software bus may certify the information in the RTOS and send it to the GPOS, where the GPOS may verify the information and the certificate attached.

According to a further embodiment, the secure communication is an encrypted communication.

According to an embodiment, the data to be transmitted may be encrypted. This may be done for example using a public/private key encryption or any other kind of encryption being suitable to encrypt the transmitted data.

According to a further embodiment, the data of the real-time operating system or the data of the general purpose operating system are available as subscribed data via the software bus.

The data, which may data or information from different devices being assigned to the corresponding operating system, e.g. controllers, sensors, cloud information or the like, might need to be translated between the operating systems. GPOS and RTOS may use different languages and thus data from the RTOS has to be translated to reach the GPOS. When the data is already present in translated form, the data may be called subscribed data.

According to a further embodiment, the secure communication for accessing the data is performed as direct access to the subscribed data without access to the real-time operating system or the general purpose operating system, to which the data to be accessed belong.

When the data is already present in translated form, i.e. as subscribed data, the data can be directly requested and transmitted without any further access to the operating systems themselves.

According to a further embodiment, the data of the real-time operating system or the data of the general purpose operating system are available on the real-time operating system or the general purpose operating system.

In case that the data is not present in subscribed form, this means that the data from the different devices being assigned to each of the operating systems may be already available on one of the operating systems, but not in a translated form.

According to a further embodiment, the secure communication for accessing the data is performed as access to the real-time operating system or the general purpose operating system, to which the data to be accessed belong.

In this case, the data may be subscribed and then access will be granted. The translation into the language of the other operating system may be performed in response to the request of a user.

According to a further embodiment, the data of the real-time operating system is not available on the general purpose operating system, or the data of the general purpose operating system is not available on the real-time operating system.

In an embodiment, the data are neither available in translated form nor on the operating system but are only available in the connected devices.

According to a further embodiment, performing the secure communication between the real-time operating system and the general purpose operating system via the established secure communication path for accessing the data includes retrieving the data from a device being connected to the real-time operating system or the general purpose operating system, to which the data to be accessed belong, and accessing the data via the real-time operating system or the general purpose operating system, to which the data to be accessed belong.

Thus, the data may be retrieved from the device being connected to one of the operating systems in response to the request from a user and may be translated subsequently. Finally, the translated data may be provided to the other operating system as described above.

According to a further aspect, an embodiment relates to a computer program product comprising a program code for executing the above-described method for performing a secure communication between a real-time operating system and a general purpose operating system when run on at least one computer.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

According to a further aspect, an industrial computing apparatus for performing a secure communication between a real-time operating system and a general purpose operating system is suggested. The industrial computing apparatus comprises a real-time operating system and a general purpose operating system being provided in the industrial computing apparatus as a single computing apparatus, a virtual machine monitor for separating the real-time operating system and a general purpose operating system, wherein the real-time operating system comprises a first open platform communications interface and the general purpose operating system comprises a second open platform communications interface, wherein the virtual machine monitor is configured to receive a request from a user via the first or the second open platform communications interfaces to access data of the real-time operating system from the general purpose operating system or to access data of the general purpose operating system from the real-time operating system, to establish a secure communication path via a software bus between the first and the second open platform communications interfaces according to the request, and to perform a secure communication between the real-time operating system and the general purpose operating system via the established secure communication path.

The industrial computing apparatus may be for example a programmable logic controller, PLC. A PLC may be used for automation of typically industrial electromechanical processes, such as control of machinery on factory assembly lines, amusement rides, or light fixtures.

The industrial computing apparatus may comprise a plurality of input/output units, non-volatile memories, processing units and so on. The GPOS and the RTOS may each be stored in a non-volatile memory and may be executed by a processing unit, for example a CPU.

According to an embodiment, the first open platform communications interface and/or the second open platform communications interface are provided in an open platform communications unified architecture.

OPC unified architecture (OPC UA) refers to an industrial machine-to-machine (M2M) communication protocol for interoperability developed by the OPC foundation. OPC UA provides a path forward from the original OPC communications model to a cross-platform service-oriented architecture (SOA) for process control, while enhancing security and providing an information model.

According to a further embodiment, the first open platform communications interface and/or the second open platform communications interface are a publish subscribe interface.

In software architecture, publish-subscribe is a messaging pattern where senders of messages, called publishers, do not program the messages to be sent directly to specific receivers, called subscribers, but instead characterize published messages into classes without knowledge of which subscribers, if any, there may be. Similarly, subscribers express interest in one or more classes and only receive messages that are of interest, without knowledge of which publishers, if any, there are.

According to a further embodiment, the first open platform communications interface and/or the second open platform communications interface are a client/server interface.

According to a further aspect, an industrial communication system comprising an industrial computing apparatus as described above is suggested.

Such an industrial communication system may be for example an automation system integrating a plurality of different devices being assigned to operating systems of multiple industrial computing apparatuses.

The embodiments and features described with reference to the apparatus apply mutatis mutandis to the method and vice versa.

Further possible implementations or alternative solutions of one or more aspects also encompass combinations—that are not explicitly mentioned herein—of features described above or below with regard to one or more embodiments. The person skilled in the art may also add individual or isolated aspects and features to the most basic form of one or more embodiments.

Further embodiments, features and advantages will become apparent from the subsequent description and dependent claims, taken in conjunction with the accompanying drawings.

DESCRIPTION OF EMBODIMENTS

Figure 1:
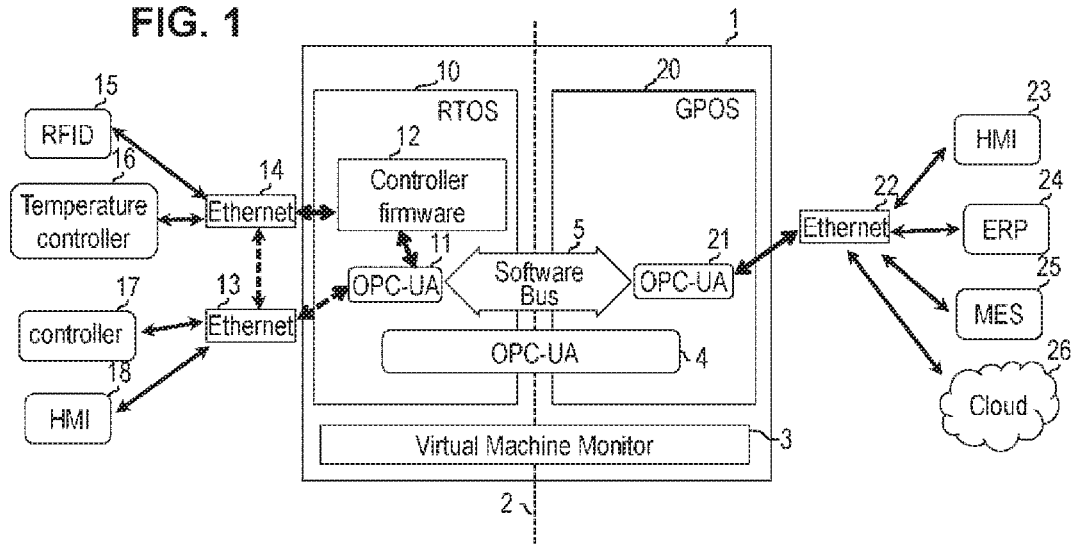
FIG. 1 is a schematic block diagram illustrating an industrial computing apparatus.

In the Figures, like reference numerals designate like or functionally equivalent elements, unless otherwise indicated.

FIG. 1 shows an industrial computing apparatus 1 for performing a secure communication between a real-time operating system (RTOS) 10 and a general purpose operating system (GPOS) 20.

The RTOS 10 and the GPOS 20 are provided in the industrial computing apparatus 1, which serves as a single computing apparatus. A virtual machine monitor 3, also called hypervisor, separates (indicated by reference 2) the RTOS 10 and the GPOS 20. The RTOS 10 corresponds to a machine network and the GPOS 20 corresponds to a M2M network.

The RTOS 10 comprises a first open platform communications interface 11. The RTOS 10 can communicate via the interface 11 directly with the Ethernet 13 and thus with different devices, like RFID devices 15, temperature controllers 16, controllers 17, or HMI devices 18. Alternatively, the interface 11 may connect the RTOS 10 via a controller firmware 12 to the Ethernet 14 and thus to the devices 15 to 18.

The GPOS 20 comprises a second open platform communications interface 21. The GPOS 20 can communicate via the interface 21 directly with the Ethernet 22 and thus with different devices, like HMI devices 23, Enterprise-Resource-Planning (ERP) devices 24, manufacturing execution systems (MES) 25 or cloud systems 26.

The first and the second open platform communications (OPC) interfaces 11 and 21 may be implemented as one interface 4 as open platform communications unified architecture (OPC-UA). The OPC UA 4 itself may treat both operating systems 10, 20 as one. A user at the M2M network side will interact only with one OPC at the GPOS side, i.e. the GPOS OPC-UA 21. Vice versa, a user at the machine network side will interact only with one OPC at the machine network side, i.e. the RTOS OPC-UA 11.

In order to exchange data between the RTOS 10 and the GPOS 20, the virtual machine monitor 3 can establish a communication path via a software bus 5.

If the user wants to interact with an element on the RTOS 10 from the M2M network, the instruction will be given to the OPC-UA 21 via a protocol that facilitates the connection. In an embodiment, the connection is an Ethernet connection via an Ethernet network 22 but is not limited thereto. The OPC-UA 21 will communicate with the OPC-UA 11 via the software bus 5.

Figure 2:
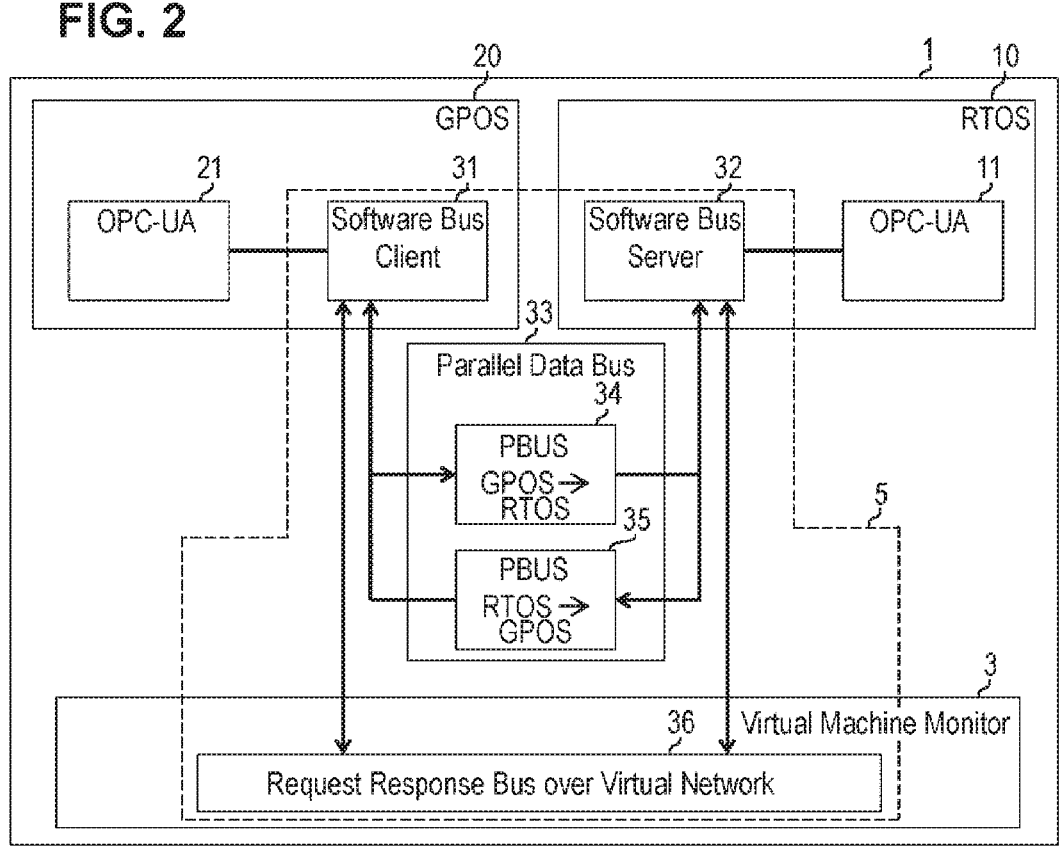
FIG. 2 is a schematic block diagram illustrating a structure of a software bus as used in an industrial computing apparatus, such as in 1.

A schematic block diagram of the structure of the software bus 5 is shown in FIG. 2.

The software bus 5 implements two protocols: a parallel data bus (Pbus) 33 and a dual request/response bus (RRBus) 36.

The OPC-UA 11 may set up a secured connection via the RRBus 36 using certificates. Once set up, the OPC-UA 11 will pass the request via the secured connection 35 of the Pbus 33 to the OPC-UA 21. The response will be returned via this secured connection 34 of the Pbus 33 as well.

The requests and responses may be handled via a software bus client interface 31 on the GPOS 20 side and a software bus server interface 32 on the RTOS 10 side.

Different scenarios for requesting and retrieving data will be described in the following with reference to FIGS. 3 to 6. It should be noted that, although the processes will be described in the following starting from the GPOS 20 and retrieving data from the RTOS 10, the described steps can also be applied vice versa.

Figure 3:
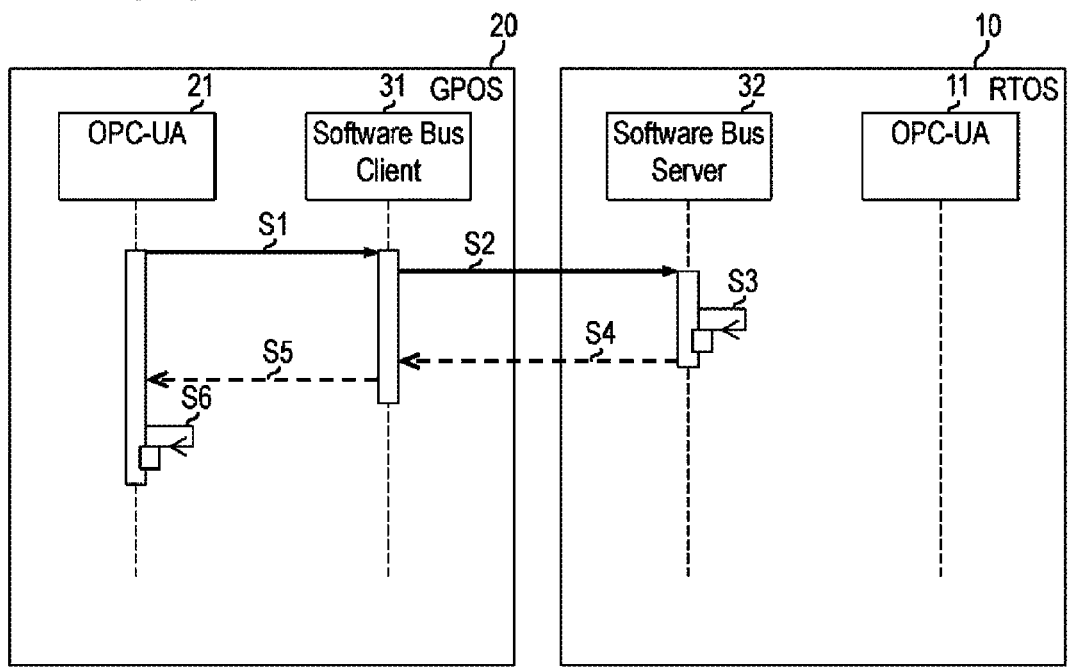
FIG. 3 is an example of method steps illustrating validation of a communication in an industrial computing apparatus, such as FIG. 1.

At the beginning, the connection between the GPOS 20 and RTOS 10 will be established as shown in FIG. 3.

In step S1, a request for connection is supplied from the OPC-UA 21 to the software bus client interface 31. In step S2, this request is forwarded from the software bus client interface 31 via the software bus 5 to the software bus server interface 32. The software bus 5 validates the request, i.e. may verify the information and the certificate attached in step S3.

A response is sent in step S4 from the software bus server interface 32 to the software bus client interface 31 and then forwarded to the OPC-UA 21 in step S5.

In step S6, the response from the software bus server interface 32 may be validated at the OPC-UA 21 and the connection, i.e. the communication path for the secure communication, is established.

Figure 4:
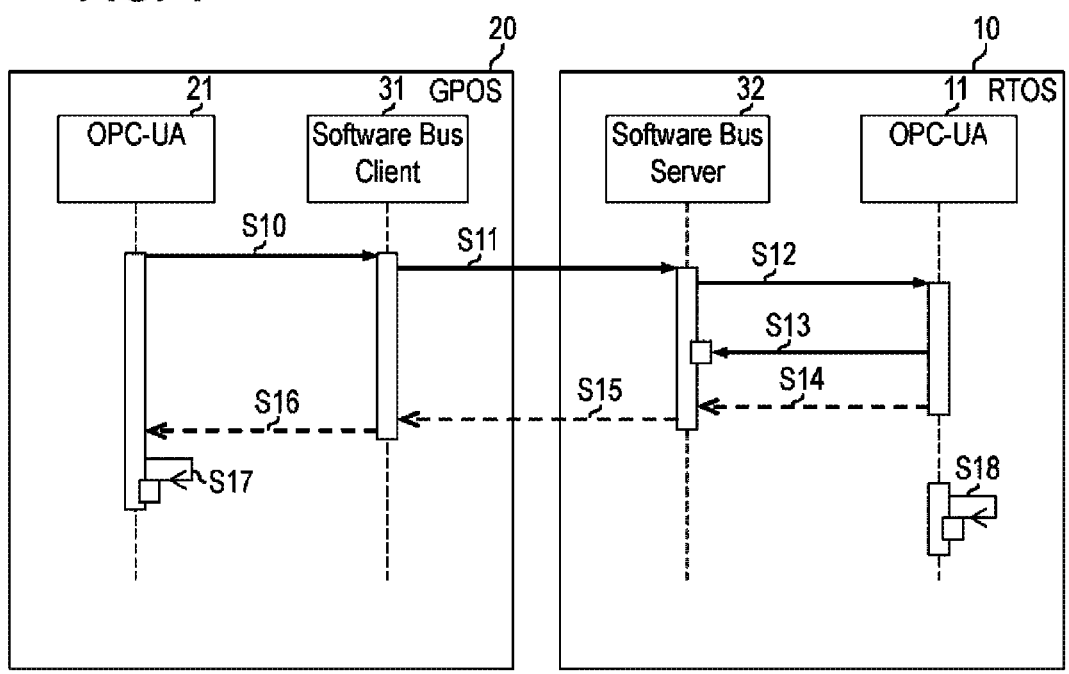
FIG. 4 is an example of method steps for translation of data in an industrial computing apparatus, such as in FIG. 1.

In FIG. 4, method steps are described for initiating the translation, also called subscription, of data.

In step S10, a request for initiating a subscription is supplied from the OPC-UA 21 to the software bus client interface 31. In step S11, this request is forwarded from the software bus client interface 31 via the software bus 5 to the software bus server interface 32. The software bus server interface 32 forwards the request to the OPC-UA 11 in step S12.

Subsequently, in step S13 the requested data are subscribed and mapped in the Pbus 33. This means that the requested data is translated into the language of the GPOS 20 and then a location in the Pbus 33 is mapped to the data. In an optional previous step S18, the data may be retrieved in the OPC-UA 11.

A response indicating the subscribed data location is sent in step S14 from the OPC-UA 11, in step S15 from the software bus server interface 32 to the software bus client interface 31 and then forwarded to the OPC-UA 21 in step S16.

In step S17, the subscribed data may be retrieved from the Pbus 33 at the OPC-UA 21.

Figure 5:
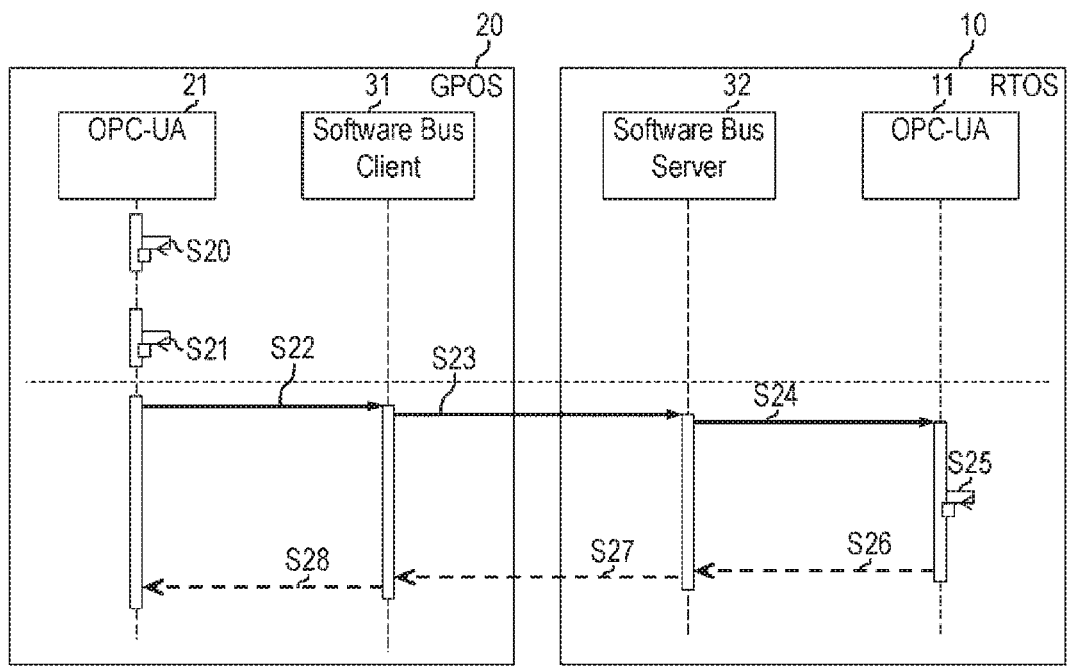
FIG. 5 is an example of method steps illustrating local data retrieval in an industrial computing apparatus, such as in FIG. 1.

In FIG. 5, method steps are described for local retrieving of data.

In step S20, it is checked at the OPC-UA 21, whether the data to be retrieved, i.e. the data requested by a user, are already available in subscribed form.

If this is the case, the data can be retrieved in step S21 from the location in the Pbus 33 as described above.

If the requested data are not available in subscribed form, a request for retrieving data is supplied from the OPC-UA 21 to the software bus client interface 31 in step S22. In step S23, this request is forwarded from the software bus client interface 31 via the software bus 5 to the software bus server interface 32. The software bus server interface 32 forwards the request to the OPC-UA 11 in step S24.

Subsequently, in step S25 the requested data are retrieved locally by the OPC-UA 11 from the RTOS.

A response including the retrieved data is sent in step S26 from the OPC-UA 11 to the software bus server interface 32, in step S27 from the software bus server interface 32 to the software bus client interface 31 and then forwarded to the OPC-UA 21 in step S28.

Figure 6:
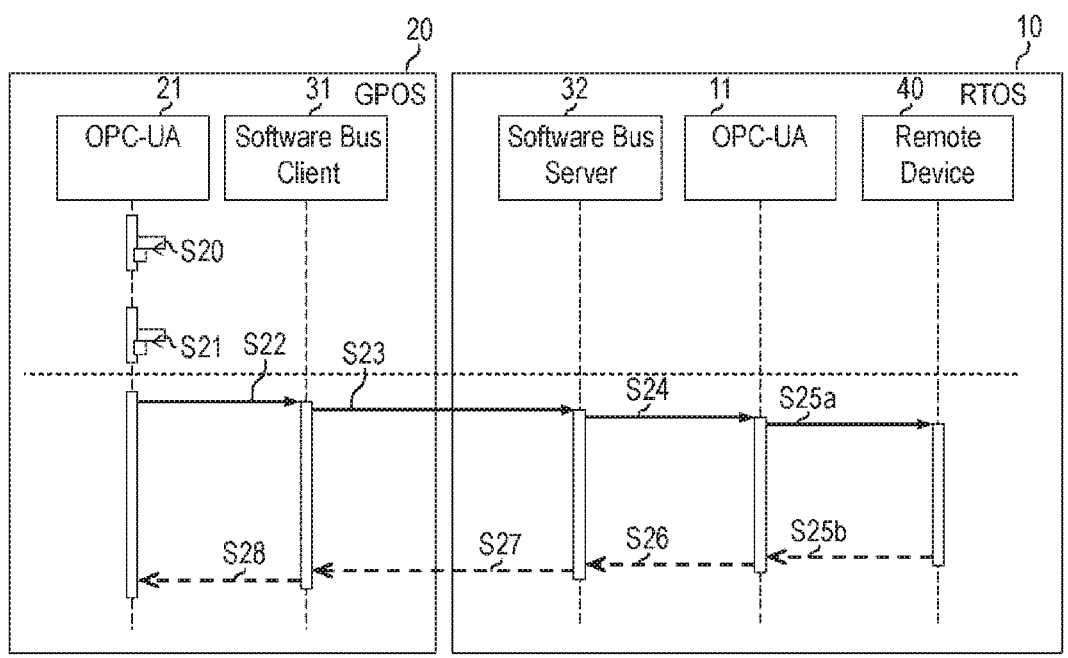
FIG. 6 is an example of method steps illustrating remote data retrieval in an industrial computing apparatus, such as in FIG. 1.

If the data is not available at the RTOS 10 at the moment of the request, the OPC-UA 11 will gather the information from a connected remote device 40 via a suitable protocol, for example but not limited to: EtherCAT or EtherNet/IP, in steps S25a and S25b as shown in FIG. 6, which differs only in steps 25, 25a, 25b from the method of FIG. 5.

Once the data is returned to the OPC-UA 11, the OPC-UA 11 will transfer the response data via RRbus 36 to the OPC-UA 21 as described in FIG. 5.

Using the industrial computing apparatus 1 and the methods as described herein, it is possible to provide a secure communication between different operating systems being included in one single computing apparatus.

Although the present invention has been described in accordance with preferred embodiments, it is obvious for the person skilled in the art that modifications are possible in all embodiments.

REFERENCE SIGNS LIST

1 Industrial computing apparatus; 2 Separation; 3 Virtual machine monitor; 4 OPC-UA; 5 Software bus; 10 RTOS; 11 OPC-UA; 12 Controller firmware; 13, 14, 22 Ethernet; 15 RFID device; 16 Temperature controller; 17 Controller; 18, 23 HMI device; 20 GPOS; 21 OPC-UA; 24 ERP; 25 MES; 26 Cloud systems; 31 Software bus client interface; 32 Software bus server interface; 33, 34, 35 Parallel data bus; 36 Request response bus; S1-S6, S10-S18, S20-S28 method steps.

The invention claimed is:

1. A method for performing a secure communication between a real-time operating system comprising a first open platform communications interface and a general purpose operating system comprising a second open platform communications interface, the real-time operating system and the general purpose operating system comprised in a single computing apparatus and separated by a virtual machine monitor, the method comprising:
   receiving a request in the virtual machine monitor via the first or the second open platform communications interface to access data of the real-time operating system from the general purpose operating system or to access data of the general purpose operating system from the real-time operating system,
   establishing a secure communication path via a software bus between the first and the second open platform communications interfaces according to the request, and
   performing a secure communication between the real-time operating system and the general purpose operating system via the established secure communication path for accessing the requested data wherein
   the software bus comprises a dual request/response bus and a parallel data bus,
   the virtual machine monitor transmits the request and the requested data in response to the request between the real-time operating system and the general-purpose operating system by the dual/request response bus, and
   the requested data in response to the request is transmitted to the first or the second open platform communications interface from which the request was received, by the parallel data bus.

2. The method according to claim 1, wherein communication via the established secure communication path is based on a first communication protocol and a second communication protocol.

3. The method according to claim 2, wherein the first communication protocol comprises a communication protocol for the parallel data bus and the second communication protocol comprises a protocol for the dual request/response bus.

4. The method according to claim 1, wherein the secure communication comprises a communication comprising at least one of: a certificate; and a signature.

5. The method according to claim 1, wherein the secure communication comprises an encrypted communication.

6. The method according to claim 1, wherein the data of the real-time operating system or the data of the general purpose operating system comprises data available as subscribed data via the software bus.

7. The method according to claim 6, wherein the secure communication for accessing the data comprises direct access to the subscribed data without access to the real-time operating system or the general purpose operating system, to which the data to be accessed belongs.

8. The method according to claim 1, wherein the data of the real-time operating system comprises data available to the general purpose operating system, and the data of the general purpose operating system comprises data available to the real-time operating system.

9. The method according to claim 8, wherein the secure communication for accessing the data comprises access to the real-time operating system or the general purpose operating system, to which the data to be accessed belongs.

10. The method according to claim 1, wherein performing the secure communication between the real-time operating system and the general purpose operating system via the established secure communication path for accessing the data further comprises:
    retrieving the data from a device being connected to the real-time operating system or the general purpose operating system, to which the data to be accessed belongs, and
    accessing the data via the real-time operating system or the general purpose operating system, to which the data to be accessed belongs.

11. A non-transitory computer readable medium storing a program, which when read and executed, causes at least one computer to perform operations comprising a method for performing a secure communication between a real-time operating system comprising a first open platform communications interface and a general purpose operating system comprising a second open platform communications interface, the real-time operating system and the general purpose operating system comprised in a single computing apparatus and separated by a virtual machine monitor, the method comprising:
    receiving a request in the virtual machine monitor via the first or the second open platform communications interface to access data of the real-time operating system from the general purpose operating system or to access data of the general purpose operating system from the real-time operating system,
    establishing a secure communication path via a software bus between the first and the second open platform communications interfaces according to the request, and
    performing a secure communication between the real-time operating system and the general purpose operating system via the established secure communication path for accessing the requested data, wherein
    the software bus comprises a dual request/response bus and a parallel data bus,
    the request and the requested data in response to the request are transmitted and between the real-time operating system and the general-purpose operating system by the dual/request response bus, and
    the requested data in response to the request is transmitted to the first or the second open platform communications interface from which the request was received, by the parallel data bus.

12. An industrial computing apparatus for performing a secure communication between a real-time operating system and a general purpose operating system, the industrial computing apparatus comprising:
    a single computing apparatus in which the real-time operating system and the general purpose operating system are provided to constitute the industrial computing apparatus, and
    a virtual machine monitor separating the real-time operating system and the general purpose operating system, wherein
    the real-time operating system comprises a first open platform communications interface and the general purpose operating system comprises a second open platform communications interface, and
    the virtual machine monitor performs operations comprising:
    receiving a request from a user via the first or the second open platform communications interface to access data of the real-time operating system from the general purpose operating system or to access data of the general purpose operating system from the real-time operating system, establishing a secure communication path via a software bus between the first and the second open platform communications interfaces according to the request, and performing a secure communication between the real-time operating system and the general purpose operating system via the established secure communication path for accessing the requested data, wherein the software bus comprises a dual request/response bus and a parallel data bus, the virtual machine monitor transmits the request and the requested data in response to the request between the real-time operating system and the general-purpose operating system by the dual/request response bus, and the requested data in response to the request is transmitted to the first or the second open platform communications interface generating the request by the parallel data bus.

13. The apparatus according to claim 12, wherein at least one of: the first open platform communications interface; and the second open platform communications interface comprises an open platform communications unified architecture.

14. The apparatus according to claim 12, wherein at least one of: the first open platform communications interface and the second open platform communications interface comprises a publish subscribe interface.

15. The apparatus according to claim 12, wherein at least one of: the first open platform communications interface and the second open platform communications interface comprise a client/server interface.

* * * * *